(12) United States Patent
Takahashi (10) Patent No.: US 6,342,777 B1
(45) Date of Patent: Jan. 29, 2002

(54) TIME DIVISIONAL DUPLEX (TDD) SYSTEM PORTABLE TELEPHONE RELAY DEVICE

(75) Inventor: Sunao Takahashi, Tokyo (JP)

(73) Assignee: Kokusai Electric Co., Ltd., Tokyo (JP)

(*) Notice: Subject to any disclaimer, the term of this patent is extended or adjusted under 35 U.S.C. 154(b) by 0 days.

(21) Appl. No.: 09/034,191

(22) Filed: Mar. 3, 1998

(30) Foreign Application Priority Data

Mar. 4, 1997 (JP) ............................................. 9-065294

(51) Int. Cl.[7] .............................................. A63B 37/00
(52) U.S. Cl. ..................... 320/315; 370/328; 370/329; 370/331; 370/334; 370/501; 370/492; 455/555; 455/11.1
(58) Field of Search ................................ 370/501, 492, 370/315, 328, 329, 331, 334; 455/555, 11.1

(56) References Cited

U.S. PATENT DOCUMENTS

| | | | | |
|---|---|---|---|---|
| 5,349,631 A | * | 9/1994 | Lee | 379/59 |
| 5,726,980 A | * | 3/1998 | Rickard | 370/293 |
| 5,918,154 A | * | 6/1999 | Beasley | 455/11.1 |
| 5,930,726 A | * | 7/1999 | Fujita | 455/555 |
| 6,005,884 A | * | 12/1999 | Cook et al. | 375/202 |

FOREIGN PATENT DOCUMENTS

| | | |
|---|---|---|
| DE | 195 14933 A1 | 10/1996 |
| GB | 2 176 079 A | 12/1996 |
| JP | 7 22873 | 1/1995 |

* cited by examiner

*Primary Examiner*—Hassan Kizou
*Assistant Examiner*—Thein Tran
(74) *Attorney, Agent, or Firm*—McGinn & Gibb, PLLC (57) ABSTRACT

A time division duplex (TDD) portable telephone relay device (and TDD system employing the same) for use with a radio base station and a portable telephone terminal within a terminal building, includes first and second distributors, a synthesizer, a predetermined-size (e.g., relatively small, internal) base station section, a position detecting unit, a synchronous receive section, and an exclusive telephone line connecting unit. With such a structure, transmission/ reception using a frequency channel, other than frequency channels assigned to a radio zone where the terminal building exists, is conducted between the portable telephone terminal within the terminal building and the radio base station through the predetermined-size base station section. The predetermined-size base station section executes the operation adapted to TDD based on a synchronous signal from the synchronous receive section.

17 Claims, 5 Drawing Sheets

TIME DIVISIONAL DUPLEX (TDD) SYSTEM PORTABLE TELEPHONE RELAY DEVICE

BACKGROUND OF THE INVENTION

1. Field of the Invention

The present invention generally relates to a time division duplex (TDD) portable telephone relay device for relaying a radio telephone line between a radio base station within one radio zone in a TDD portable telephone service area including a plurality of radio zones, and a portable telephone terminal within an electrical signal insensitive region in the radio zone.

More particularly, the present invention relates to the effective use of the line by positively utilizing the TDD portable telephone relay device located in the electrical signal insensitive region.

2. Description of the Related Art

A portable telephone service area includes a plurality of radio zones. When a portable telephone terminal moves from one radio zone to another, a control signal transmit/receive means, which is called a control channel, assigns a utilizing frequency channel to the terminal. When the portable telephone terminal is not in a communicating status and a utilizing frequency channel is not still assigned to the terminal, an exclusive frequency channel predetermined in the portable telephone service area is used as the control channel. When the portable telephone terminal is in a communicating status, the control channel is maintained by means of multiplexing it with the utilizing frequency channel assigned to the terminal. The above two channels are called altogether control channels in the following description.

Currently, a portable telephone relay device is used to enable a portable telephone terminal within a certain radio zone to be used with a high line quality, even in an electrical signal insensitive region at which an electrical signal from a radio base station in the radio zone does not arrive (e.g., is not received due to the nature/characteristics of the region). For example, the electrical signal insensitive region may be found within the interior of a terminal building built in the radio zone, etc. Therefore, such a relay device allows a portable telephone to be used within a building, or other radio frequency shielding structure, in which the portable telephone would otherwise not be capable of communicating with an external base station.

Figure 4:
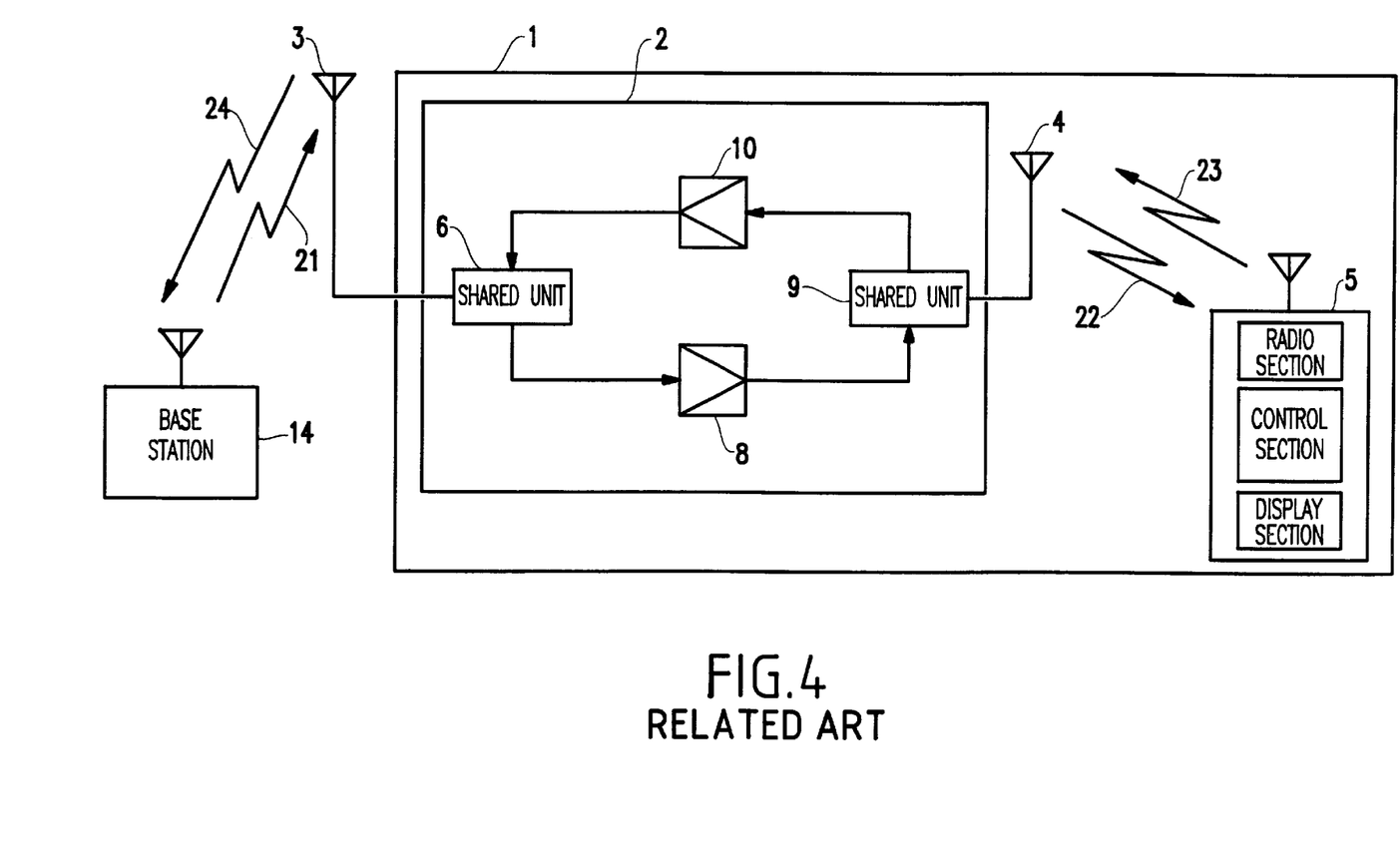
FIG. 4 illustrates a conventional system showing a portable telephone relay device 2 in relation to a radio base station 14 and a portable telephone terminal 5.

FIG. 4 shows a structure of a conventional portable telephone relay device 2 in relation to a radio base station 14 and a portable telephone terminal 5.

That is, the portable telephone relay device includes a portable telephone relay device body 2 and transmit/receive antennas 3 and 4. The device is located in a building which is within a certain radio zone, but in an electrical signal insensitive region at which no electrical signal from a radio base station 14 in the radio zone is received (e.g., a terminal building 1). The transmit/receive antenna 3 is positioned outside of the terminal building 1 (e.g., on an outer wall of the terminal building 1), so as to be opposed to the radio base station 14.

Conversely, the transmit/receive antenna 4 is positioned inside of the terminal building 1, so as to be opposed to a portable telephone terminal 5 within the terminal building 1. It is noted that the number of the terminals is not limited to one although only one terminal is shown in FIG. 4.

The portable telephone relay device body 2 includes an antenna shared unit 6 connected to the transmit/receive antenna 3, an antenna shared unit 9 connected to the transmit/receive antenna 4, and a down line (e.g., down-link) amplifier 8 and an up line (e.g., an up-link) amplifier 10 which are connected to a down transmission line and an up transmission line between the antenna shared units 6 and 9, respectively.

When the portable telephone relay device is located in the terminal building 1, even if the inside of the terminal building 1 is in an electrical signal insensitive region as described above, a relay device down receive wave (e.g., signal) 21 from the radio base station 14 is received by the transmit/receive antenna 3 outside of the terminal building 1. An electrical signal corresponding to the relay device down receive wave 21 (e.g., hereinafter referred to as "relay device down receive signal 21") is input to the antenna shared unit 6 and is amplified by the down line amplifier 8. The amplified signal is output to the antenna shared unit 9 and through the transmit/receive antenna 4 to the inside of the terminal building 1 as a relay device down transmit wave (e.g., signal) 22. Thus, the portable telephone terminal 5 can receive the relay device down transmit signal 22.

Additionally, a relay device up receive wave (e.g. signal) 23 output from the portable telephone terminal 5 is received by the transmit/receive antenna 4, and an electrical signal corresponding to the relay device up receive wave 23 (e.g., hereinafter referred to as "relay device up receive signal 23") is input through the antenna shared unit 9 and amplified by the up line amplifier 10. Then, the amplified signal is output to the antenna shared unit 6 and through the transmit/receive antenna 3 to the radio base station 14 as a relay device up transmit signal 24.

Thus, the portable telephone relay device ensures a high line quality between the portable telephone terminal 5 and the radio base station 14, even when the portable telephone terminal 5 within the terminal building 1 is in the electrical signal insensitive region (e.g., the interior of terminal building 1 is not substantially in the electrical signal insensitive region).

However, as described above, the conventional portable telephone relay device is designed such that the electrical signal insensitive region, which is within a certain radio zone, is merely changed to a space that provides a line between the portable telephone terminal and the radio base station in the radio zone as in other general regions within the radio zone.

Further, the conventional portable telephone relay device is not designed so as to save frequency channels used in the radio zone by positively considering that the electrical wave insensitive region is a space insulated from the outside of that region with respect to the electrical wave.

Therefore, with a conventional relay device, a call which is initiated outside the building 1 must be terminated and then restarted when entering the building 1. Hence, the call cannot be continued without interruption from outside the building 1 to inside the building 1. Similarly, a call which is initiated within the building 1 cannot be continued outside the building because the frequency being used for the telephone call has not been reserved with the external base station 14.

SUMMARY OF THE INVENTION

In view of the foregoing and other problems of the conventional systems and devices, an object of the present invention is to provide a time division duplex (TDD) portable telephone relay device and a TDD portable telephone system for effectively utilizing the line and also for effectively utilizing a frequency by positively considering that a location where a portable telephone terminal exists is in an electrical wave insensitive region.

To achieve the above and other objects, according to a first aspect of the present invention, there is provided a TDD portable telephone relay device for relaying a telephone line between a radio base station within one radio zone in a TDD system portable telephone service area including a plurality of radio zones and a portable telephone terminal which is within an electrical wave insensitive region in the radio zone, the device including:

a first relay unit for relaying a radio telephone line between the radio base station and the portable telephone terminal within the electrical wave insensitive region in the radio zone of the radio base station, using a radio zone frequency channel of the radio base station; and a second relay unit, connected to the radio base station through an exclusive wire telephone line, for conducting transmission/reception with respect to the radio base station through the exclusive wire telephone line, and for conducting transmission/reception with respect to the portable telephone terminal within the electrical wave insensitive region using a predetermined frequency channel which is not assigned to the radio zone, wherein a relay between the radio base station and the portable telephone terminal is performed based on a control signal from the radio base station using any one of the first relay unit and the second relay unit.

According to another aspect of the present invention, there is provided a TDD portable telephone relay device for relaying a telephone line between a radio base station within one radio zone in a TDD system portable telephone service area including a plurality of radio zones and a portable telephone terminal which is within an electrical wave insensitive region in the radio zone, the device including:

a first transmit/receive antenna opposed to the radio base station out of the electrical wave insensitive region;

a second transmit/receive antenna opposed to the portable telephone terminal within the electrical wave insensitive region;

a first distributor including first and second output terminals, and for distributing a relay device down receive signal transmitted from the first transmit/receive antenna to output the receive signal from said first and second output terminals;

a synchronous receive section, connected to the first output terminal of the first distributor, for demodulating the relay device down receive signal as inputted to obtain a synchronous signal;

a second distributor including first, second and third output terminals, and for distributing a relay device up receive signal transmitted from the second transmit/receive antenna to output the receive signal from said first, second and third output terminals;

a position detecting unit, connected to the first output terminal of the second distributor, for detecting a frequency channel used by the portable telephone terminal positioned within the electrical wave insensitive region, to output a detection result to the radio base station through an exclusive wire telephone line;

a predetermined-size base station section, connected to the exclusive wire telephone line, for being controlled upon reception of the control signal transmitted from the radio base station through the exclusive wire telephone line, and for outputting a modulated wave electric signal obtained by modulating speech data transmitted from the radio base station through the exclusive wire telephone line using a predetermined frequency channel other than a radio zone frequency channel of the radio base station, the predetermined-size base station section further for receiving the relay device up receive signal outputted from the second output terminal, outputting only the receive signal for which the predetermined frequency channel is used among the relay device up receive signals to the radio base station through the exclusive wire telephone line, and outputting information relating to the use state of the predetermined frequency channel to the radio base station through the exclusive wire telephone line;

a synthesizer, connected to a modulated wave electric signal output terminal of the predetermined-size base station section and the second output terminal of the first distributor, for synthesizing and outputting respective outputs from said modulated wave electrical signal output terminal and said second output terminal of said first distributor;

a first circulator, connected to the first transmit/receive antenna, an input side of the first distributor, and the third output terminal of the second distributor, for outputting the receive signal from the first transmit/receive antenna to the input side of the first distributor, and outputting the output signal from the third output terminal of the second distributor to the second transmit/receive antenna; and a second circulator, connected to an output side of the synthesizer, an input terminal of the second distributor, and the second transmit/receive antenna, for outputting the output signal of the synthesizer to the second transmit/receive antenna and outputting the receive signal from the second transmit/receive antenna to an input terminal of the second distributor.

According to another aspect of the present invention, there is provided a TDD portable telephone system, including:

a radio base station disposed within one radio zone in a TDD portable telephone service area including a plurality of radio zones;

a portable telephone terminal disposed within an electrical wave insensitive region of the radio zone;

a TDD portable telephone relay device; and an exclusive wire telephone line connecting the TDD portable telephone relay device and the radio base station.

According to another aspect of the present invention, there is provided a TDD portable telephone system, including:

a radio base station disposed within one radio zone in a TDD portable telephone service area including a plurality of radio zones;

a portable telephone terminal disposed within an electrical wave insensitive region of the radio zone;

a TDD portable telephone relay device; and an exclusive wire telephone line connecting the TDD portable telephone relay device and the radio base station, wherein, when an unused channel exists in a predetermined frequency channels according to a information relating to a use state of a predetermined frequency channel transmitted from a predetermined-size base station section of the TDD portable telephone relay device, for conducting transmission/reception to the portable telephone terminal through a second relay unit using an unused frequency channel, the radio base station transmits a control signal to the portable telephone terminal using a control channel to fix a channel used by the portable telephone terminal to the unused channel.

According to another aspect of the present invention, there is provided a TDD portable telephone system, including:

a radio base station disposed within one radio zone in a TDD portable telephone service area including a plurality of radio zones;

a portable telephone terminal disposed within an electrical wave insensitive region of the radio zone;

a TDD portable telephone relay device; and an exclusive wire telephone line connecting the TDD portable telephone relay device and the radio base station, wherein, when it is judged based on a detection signal of a position detecting unit that the portable telephone terminal is outside the electrical wave insensitive region when the transmission/reception between the portable telephone terminal and the TDD portable telephone relay unit is conducted, using a predetermined frequency channel within frequency channels which are not assigned to the radio zone, the radio base station transmits a control signal to the portable telephone terminal using the control channel to change a use channel from the predetermined frequency channel to a radio zone frequency channel of the radio base station, and controls a second relay unit to finish the transmission/reception to the portable telephone terminal.

With the TDD portable telephone relay device and TDD portable telephone system of the present invention, the line and the frequency can be utilized effectively.

Further, unlike the conventional portable telephone relay device, the portable telephone relay device of the present invention is affirmatively designed such that even when the portable telephone is in the electrical signal insensitive region, which is within a certain radio zone, the relay device provides a line between the portable telephone terminal and the radio base station in the radio zone as in other general regions within the radio zone.

Moreover, the inventive portable telephone relay device is designed to efficiently use (and save) frequency channels in the radio zone by considering characteristics of the electrical wave insensitive region.

BRIEF DESCRIPTION OF THE DRAWINGS

The foregoing and other objects, aspects and advantages will be better understood from the following detailed description of a preferred embodiment of the invention with reference to the drawings, wherein:

FIGS. 3A–3C are explanatory diagrams showing the operation of a synchronous receive section 15 of the portable telephone relay device of the preferred embodiment, in which FIGS. 3A–3B are to be viewed as a combined diagram.

DETAILED DESCRIPTION OF A PREFERRED EMBODIMENT OF THE INVENTION

Figure 1:
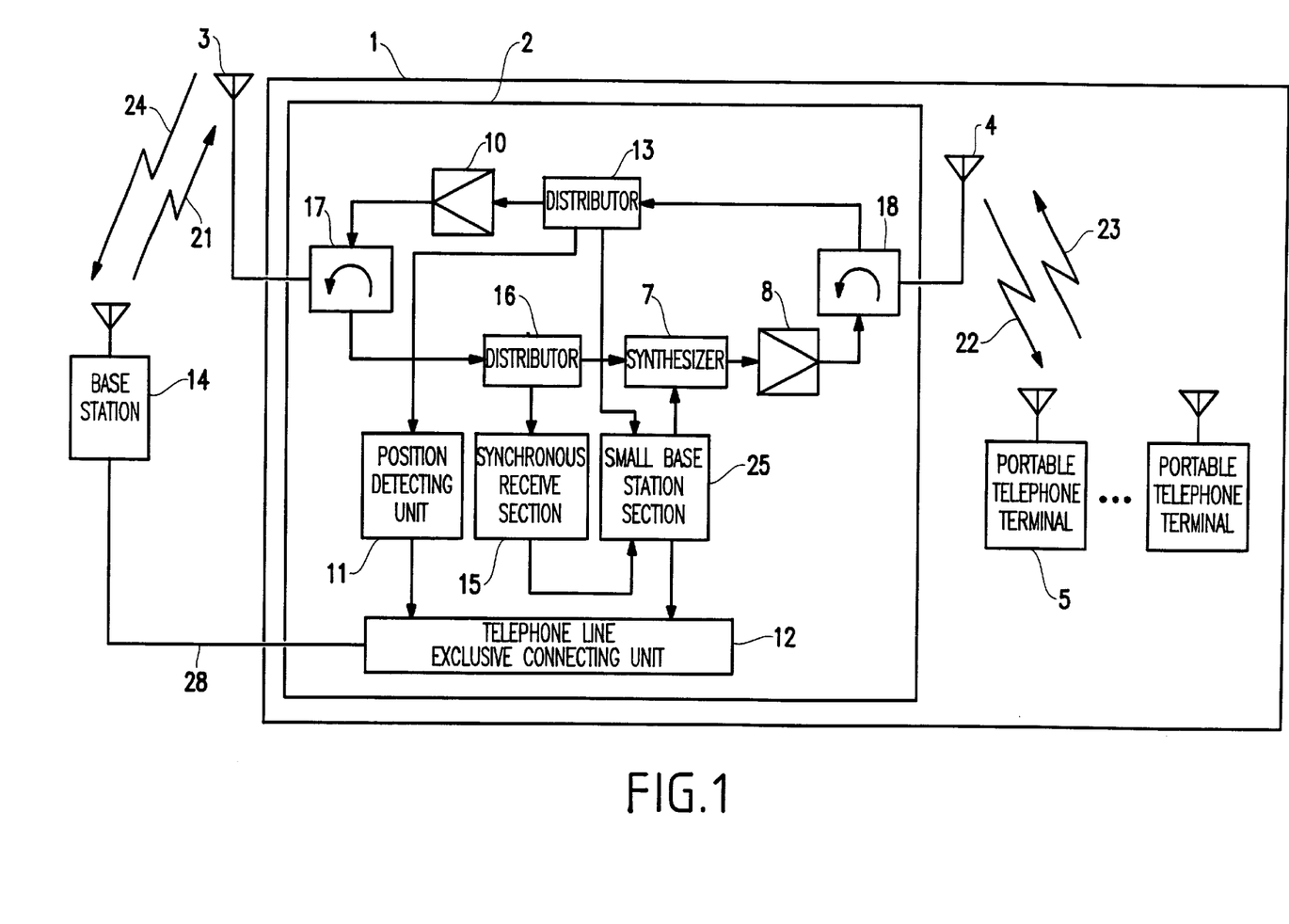
FIG. 1 schematically illustrates a structure of a time division duplex portable telephone relay device and system according to a preferred embodiment of the present invention.

Referring now to the drawings, and more particularly to FIG. 1, there is shown the details of a preferred embodiment of the present invention. In FIG. 1, for ease of understanding, circuit sections having the substantially same structure and function as those of the circuit sections in FIG. 4 showing the conventional device are designated by the same reference numerals, and, for brevity, the description of those circuit sections will be omitted.

Turning now to the detailed structure of the preferred embodiment, FIG. 1 illustrates the structure of a TDD portable telephone relay device 2 according to the preferred embodiment, in relation to a radio base station 14 and a portable telephone terminal 5 within a terminal building 1 which is in an electrical wave insensitive region.

In the portable telephone relay device 2 according to the present invention, a circulator 17 is provided for outputting a relay device down receive signal 21, transmitted from a transmit/receive antenna 3, to only a distributor 16, and for outputting a relay device up receive signal 23 transmitted from an up line amplifier 10 to only the transmit/receive antenna 3.

Additionally, a circulator 18 is provided for outputting the relay device up receive signal 23 transmitted from a transmit/receive antenna 4 to only a distributor 13, and for outputting a synthesized electrical signal amplified and transmitted by a down line amplifier 8 to only the transmit/receive antenna 4.

An exclusive telephone line connecting unit 12, connected to radio base station 14 through an exclusive wire telephone line 28, is for connecting a first end of the exclusive wire telephone line 28 to an internal base station section 25 having a predetermined size (e.g., a relatively small base station section) and a position detecting unit 11 described below. A second end of the exclusive wire telephone line 28 is coupled to the radio base station 14.

The small base station section 25 includes a circuit section to which a plurality of remote zone frequency channels are assigned. The circuit section is controlled upon reception of a control signal transmitted from the radio base station 14 through the exclusive wire telephone line 28 and the exclusive telephone line connecting unit 12 (hereinafter referred to as "exclusive wire telephone line 28", etc.,), and receives talking (e.g., speech) data transmitted from the radio base station 14 through the exclusive wire telephone line 28, etc.

The small base station section 25 outputs a modulated electrical signal relating to the speech data to a synthesizer 7 using one of the plurality of remote zone frequency channels.

The small base station section 25 also includes a circuit section that inputs the relay device up receive signal 23 transmitted from the distributor 13 (described below), outputs only one or some (e.g., not all) of the relay device up receive signals 23 for which the remote zone frequency channel is used, to the radio base station 14 through the exclusive wire telephone line 28, etc., and also outputs information relating to the use state of the remote zone frequency channel (hereinafter referred to as "remote channel use information") to the radio base station 14 through the exclusive wire telephone line 28, etc. It is noted that the detailed circuitry for forming the circuit sections of the small base station section 25 is believed to be known to one of ordinary skill in the art taking the present specification as a whole, and thus, for brevity, such circuitry will not be discussed in detail herein.

The distributor 16 distributes the relay device down receive signal 21, received from the circulator 17, to a synchronous receive section 15 and to the synthesizer 7. The synchronous receive section 15 demodulates the relay device down receive signal 21 received from the distributor 16, thereby to obtain a synchronous signal, and outputs the synchronous signal to the small base station section 25.

The synthesizer 7 includes a circuit section that synthesizes the relay device down receive signal 21 from the circulator 17 with the modulated electric signal from the small base station section 25, thereby to output an electrical signal (e.g., a synthesized signal) to the down line amplifier 8. It is noted that the detailed circuitry for forming the circuit section of the synthesizer 7 is believed to be known to one of ordinary skill in the art taking the present specification as a whole, and thus, for brevity, such circuitry will not be discussed in detail herein.

The distributor 13 includes a circuit section that distributes the relay device up receive signal 23 transmitted from the circulator 18 side to the up line circuit amplifier 10, to a position detecting unit 11 which will be described later, and to the small base station section 25 to output the signal 23.

The position detecting unit 11 includes a circuit section for receiving the relay device up receive signal 23 from the distributor 13, and for detecting a frequency channel used by the portable telephone terminal 5 which is positioned within the terminal building 1. The position detecting unit 11 outputs a detection result to the radio base station 14 through the exclusive wire telephone line 28, etc. It is noted that the detailed circuitry for forming the circuit section of the position detecting unit 11 (as well as that of the distributor 13) is believed to be known to one of ordinary skill in the art taking the present specification as a whole, and thus, for brevity, such circuitry will not be discussed in detail herein.

The radio base station 14 includes a position detecting unit (not shown but well-known in the art) that detects frequency channels used by the respective portable telephone terminals within a radio zone of the radio base station 14 and radio zones (except for electrical wave insensitive regions) adjacent to the former radio zone as in a typical portable telephone radio base station.

Operation of the Preferred Embodiment of the Present Invention

The operation of the preferred embodiment shown in FIG. 1 will be described with reference to the explanatory diagrams of FIGS. 2 and 3A and 3B.

Figure 2:
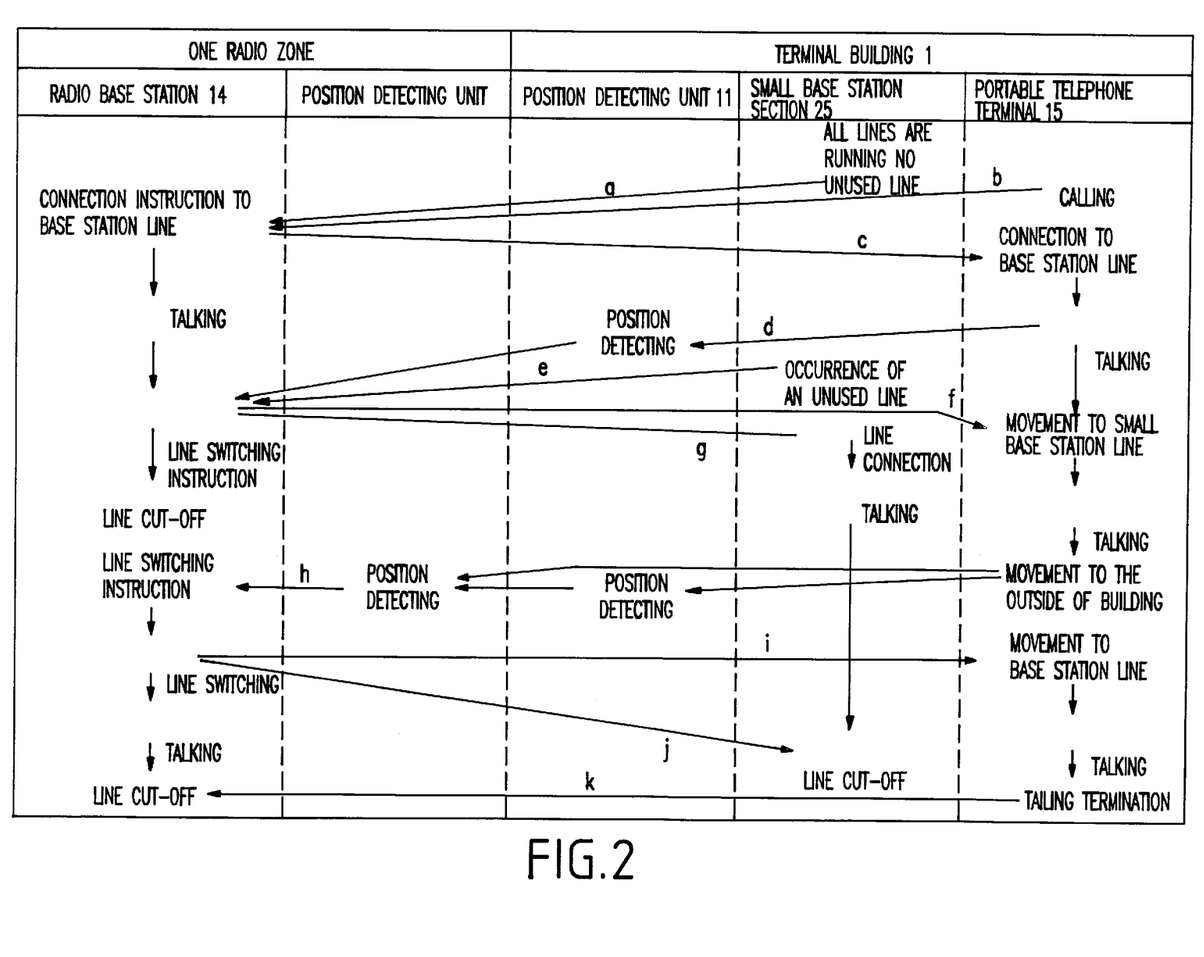
FIG. 2 is an explanatory diagram showing the operation of the structure of the preferred embodiment.

First, for exemplary purposes and ease of understanding, it is assumed that when all of the remote zone frequency channels which are assigned to the small base station section 25 are used, and remote channel use information representative of no unused frequency channel is transmitted from the small base section 25 to the radio base station 14 through the exclusive wire telephone line 28 (e.g., see arrow "a" of FIG. 2), a call signal is transmitted from the portable telephone terminal 5 to the radio base station 14 through a control channel (e.g., see arrow "b" of FIG. 2).

The radio base station 14, as shown in arrow "c" of FIG. 2, transmits the control signal to the portable telephone terminal 5 through the control channel, and fixes the portable telephone terminal 5 to the transmission/reception in the frequency channel which is assigned to that radio zone (e.g., the radio base station 14 is connected to the base station line).

As a result, talking (e.g., speech) using the base station line is started (refer to arrow "d" of FIG. 2). In this case, the position detecting unit 11 detects that the frequency channel of speech is used within the terminal building 1, and transmits a detection result to the radio base station 14 through the exclusive wire telephone line 28, etc.

In speech using the base station line, the relay device down receive wave 21 from the radio base station 14 is received by the transmit/receive antenna 3. The relay device down receive signal 21 (e.g., an electrical signal), corresponding to the relay device down receive wave 21, is provided through the distributor 16 and the synthesizer 7, and is amplified by the down line amplifier 8. The amplified signal is output to the circulator 18, provided to the transmit/receive antenna 4, and output therefrom as the relay device down transmit wave 22. The portable telephone terminal 5 receives the relay device down transmit wave 22.

Additionally, the relay device up receive wave 23 output from the portable telephone terminal 5 is received by the transmit/receive antenna 4. The relay device up receive signal 23 (e.g., an electrical signal), corresponding to the relay device up receive wave 23, is provided to the circulator 18 which provides an output to the distributor 13. The distributor 13 provides an input to the up line amplifier 10 which amplifies the relay device up receive signal, and output from the transmit/receive antenna 3 to the radio base station 14 as the relay device up transmit wave 24.

In the above state, when an unused channel exists in the remote zone frequency channels, the remote channel use information indicative of such an unused channel is transmitted to the radio base station 14 from the small base station section 25 through the exclusive wire telephone line 28 and so on, as shown in arrow "e" of FIG. 2.

Upon receipt of such information, the radio base station 14 transmits the control signal to the portable telephone terminal 5 through the control channel as shown in arrow "f" of FIG. 2, and moves the use line of the portable telephone terminal 5 to the unused remote zone frequency channel (e.g., the small base station section 25 line). Additionally, the radio base station 14 transmits the control signal to the small base station section 25 through the exclusive wire telephone line 28 and so on, to allow the remote zone frequency channel to be used for transmission/reception with respect to the portable telephone terminal 5 (e.g., see arrow "g" of FIG. 2).

As a result, the transmission/reception (talking/speech) between the radio base station 14 and the portable telephone terminal 5 is conducted through the small base station section 25 and the exclusive wire telephone line 28, etc.

When the transmission/reception (e.g., talking/speech) is conducted using the remote zone frequency channel, a part of the relay device up receive signal 23 arrives at the transmit/receive antenna 3 through the distributor 13, the up line amplifier 10 and the circulator 17, respectively, and is output as an electrical signal from the transmit/receive antenna 3.

However, in the radio zone where the terminal building 1 is located and the radio zones adjacent to that radio zone, since the remote zone frequency channel is not used as the base station line, no inconvenience occurs. Therefore, since the frequency used within the building by the inventive relay device 2 is also reserved within the radio zone of the base station 14, when the user exits the building the telephone conversation which was initiated within the building can be continued without interruption as the base station 14 will take control of the telephone call from the relay device on the same frequency. Therefore, with the invention the user can enter or exit the building and continue a conversation without interruption because the base station 14 and the relay device 2 will communicate with the portable phone on the same frequency.

While the transmission/reception (e.g., talking/speech) is conducted using the remote zone frequency channel in the above manner, when the portable telephone terminal 5 leaves (e.g., is taken out of) the terminal building 1, the radio base station 14 recognizes this state from the detection results of the position detecting unit 11 and the position detecting unit provided in the radio base station 14 (e.g., see arrow "h" of FIG. 2). Accordingly, the radio base station 14 transmits the control signal to the portable telephone terminal 5 through the control channel.

Then, the radio base station 14 moves (e.g., switches) the frequency channel used by the portable telephone terminal 5 to the frequency channel assigned to the radio zone (e.g., the base station line) (e.g., see arrow "i" of FIG. 2). Radio base station 14 transmits the control signal to the small base station section 25 through the exclusive wire telephone line 28, etc., to cut off/remove zone frequency channel (e.g., the small base station line) (e.g., see arrow "j" of FIG. 2).

Thus, in the succeeding operation, although speech (transmission/reception) is conducted through the base station line between the radio base station 14 and the portable telephone terminal 5, the control signal is transmitted from the portable telephone terminal 5 to the radio base station 14 through the control channel when speech is terminated, thereby resulting in the radio base station 14 cutting off the base station line (refer to arrow "k" of FIG. 2).

Operation of Synchronous Receive Section 15

Hereinbelow, the operation of the synchronous receive section 15 in the time division duplex talking (e.g., speech) system will be described with reference to FIGS. 3A and 3B.

Figure 3A:
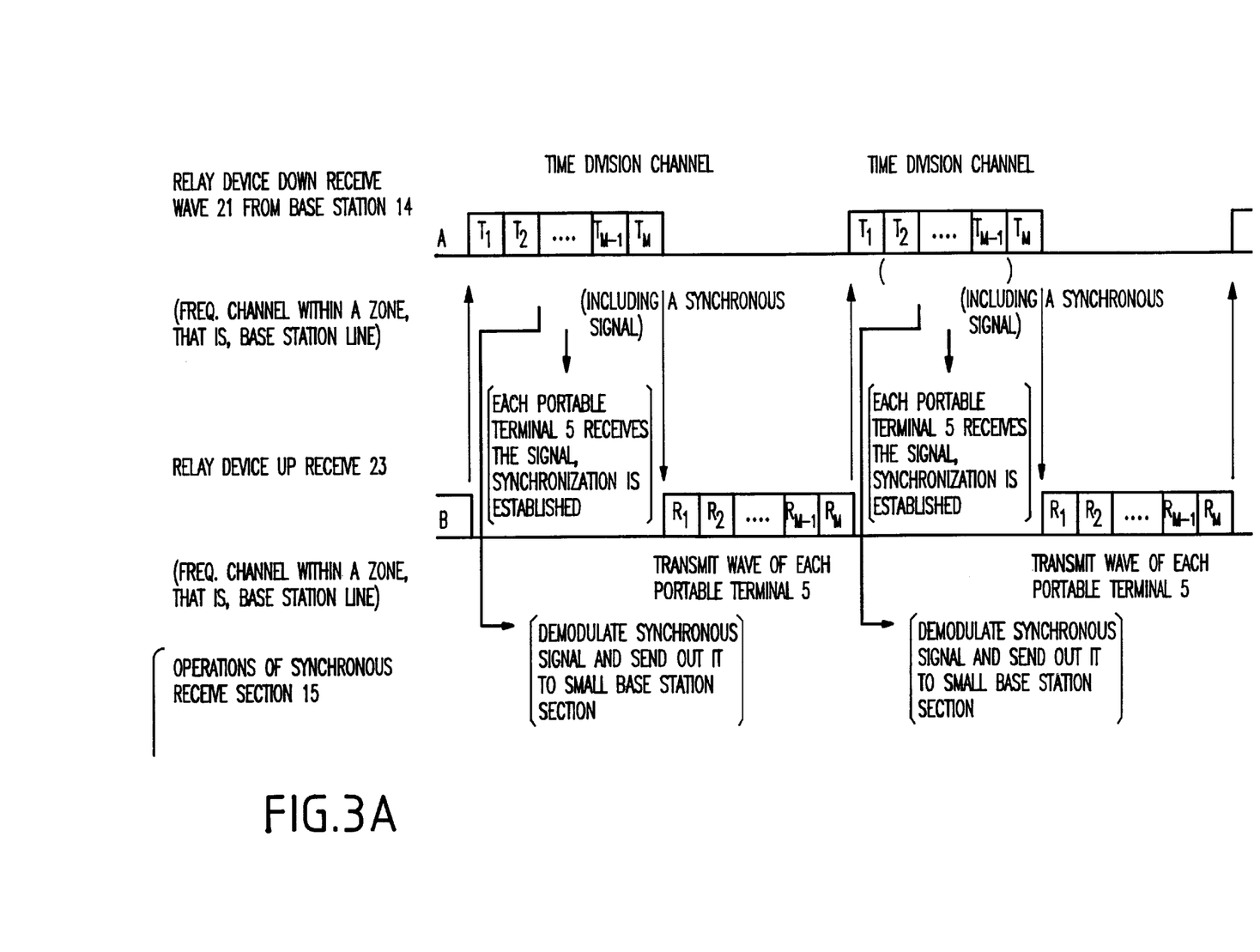
FIG. 3A shows the synchronization of portable telephone terminals and a small base station section with the operation of a radio base station.
Figure 3B:
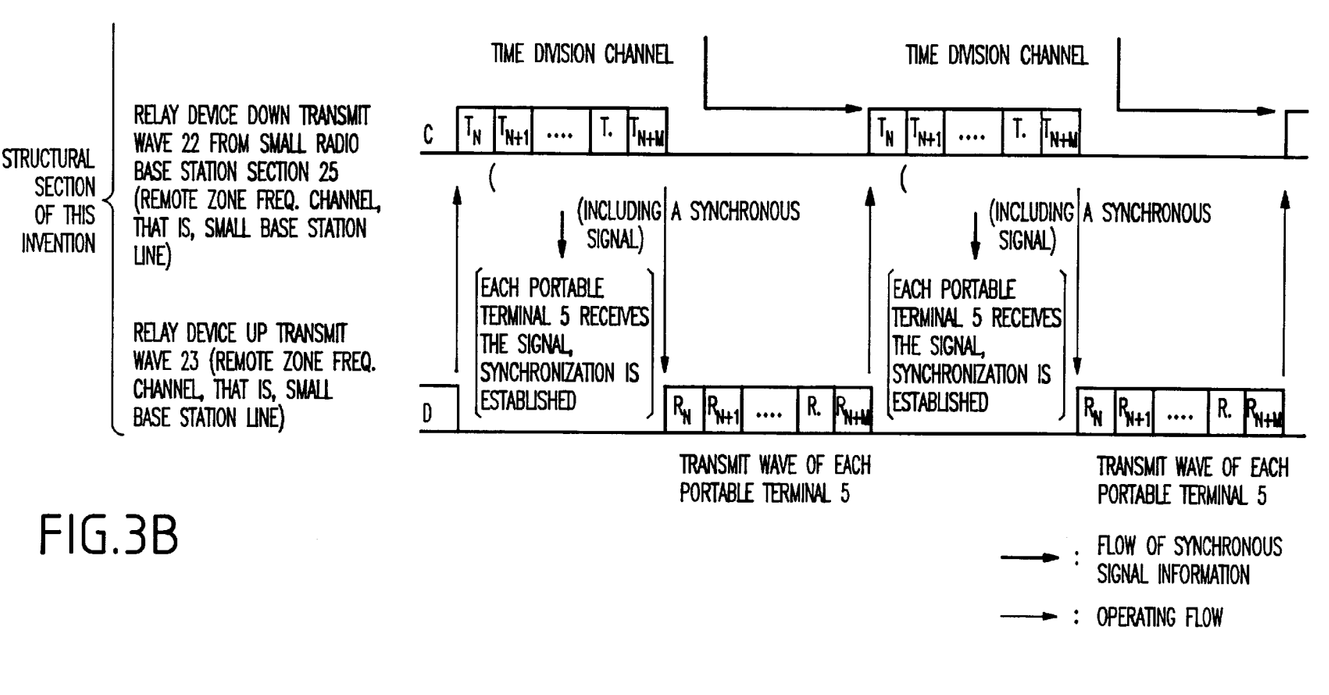
FIG. 3B shows a small base station outputting a modulated electrical signal for use by a portable telephone terminal in switching between a base station line and a small base station line, and in which FIG. 3C indicates
Figure 3C:
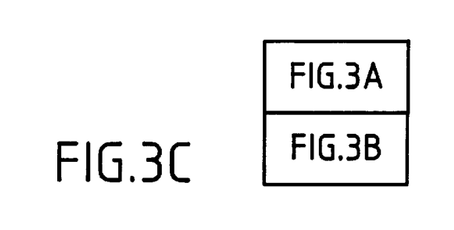

In the time division duplex talking system, all of the portable telephone terminals 5 that conduct speech communication within a certain radio zone execute the operation in synchronism with the operation of the radio base station 14 in that radio zone (e.g., see "A" and "B" of FIG. 3A). Thus, the operation of the small base station section 25 in the TDD portable telephone relay device 2 that operates within the radio zone also must be synchronized with the operation of the radio base station 14.

To realize such synchronism, the synchronous receive section 15 receives from the distributor 16 the relay device down receive signal 21 including a synchronous signal therein, demodulates signal 21 to obtain the synchronous signal, and outputs the synchronous signal to the small base station section 25 (e.g., see "A" of FIG. 3A).

The small base station section 25 executes the operation in synchronism with the operation of the radio base station 14 based on the synchronous signal, and the small base station section 25 output (e.g., the modulated electric signal) including the synchronous signal therein is input to the transmit/receive antenna 4 through the synthesizer 7 and so on. The modulated electrical signal is transmitted from the transmit/receive antenna 4 as the relay device down transmit wave 22 (e.g., see "C" of FIG. 3B). Hence, the portable telephone terminal 5 is freely movable from the base station line to the small base station line (e.g., see "D" of FIG. 3B) and vice versa without any problems.

The foregoing description of the preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one ordinarily skilled in the art to utilize the invention in various embodiments and with various modifications as are suited to the particular use contemplated. It is intended that the scope of the invention be defined by the claims appended hereto, and their equivalents.

Having thus described my invention, what I claim as new and desire to secure by Letters Patent is as follows:

1. A time division duplex (TDD) portable communicator relay device for relaying a communication line between a base station within one zone in a TDD system portable communicator service area including a plurality of zones and a portable communicator terminal which is within an electrical wave insensitive region in the zone, said device comprising:

a first relay unit for relaying a communication line between said base station and the portable communicator terminal within the electrical wave insensitive region in the zone of said base station, using a zone frequency channel of said base station; and a second relay unit, connected to said base station through an exclusive wire communication line, for conducting transmission/reception with respect to said base station through said exclusive wire communication line, and for conducting transmission/reception with respect to said portable communicator terminal within said electrical wave insensitive region using a predetermined frequency channel of a plurality of predetermined frequency channels which is not assigned to said zone, wherein a relay between said base station and said portable, communicator terminal is conducted based on a control signal from said base station using any of said first relay unit and said second relay unit.

2. A TDD portable communicator relay device as claimed in claim 1, wherein said first relay unit includes:

a transmitter/receiver for conducting a transmit/receive operation with respect to said portable communicator terminal, said second relay unit commonly using said transmitter/receiver for conducting a transmit/receive operation with respect to said portable communicator terminal.

3. A time division duplex (TDD) portable communicator relay device for relaying a communication line between a base station within one zone in a TDD system portable communicator service area including a plurality of zones and a portable communicator terminal which is within an electrical wave insensitive region in the zone, said device comprising:

a first relay unit for relaying a communication line between said base station and the portable communicator terminal within the electrical wave insensitive region in the zone of said base station, using a zone frequency channel of said base station; and a second relay unit, connected to said base station through an exclusive wire communication line, for conducting transmission/reception with respect to said base station through said exclusive wire communication line, and for conducting transmission/reception with respect to said portable communicator terminal within said electrical wave insensitive region using a predetermined frequency channel of a plurality of predetermined frequency channels which is not assigned to said zone, wherein a relay between said base station and said portable communicator terminal is conducted based on a control signal from said base station using any of said first relay unit and said second relay unit, wherein said base station outputs a control signal instructing that the communication line is relayed by said second relay unit using said predetermined frequency channel of a plurality of predetermined frequency channels when an unused channel exists in said predetermined frequency channels used in said second relay unit, and wherein said base station outputs a control signal instructing that the communication line is relayed by said first relay unit using a zone frequency channel of said base station when said predetermined frequency channels include no unused channel.

4. A TDD portable communicator relay device as claimed in claim 1, wherein said second relay unit includes:

a predetermined-size base station section for inputting speech data transmitted from said base station through said exclusive wire communication line, outputting a modulated wave signal corresponding to said speech data using said predetermined frequency channel, and outputting only a signal output from said portable communication terminal using said frequency channel to said base station through said exclusive wire communication line.

5. A TDD portable communication relay device as claimed in claim 4, wherein said predetermined-size base station section further outputs information relating to a use state of said predetermined frequency channel to said base station.

6. A TDD portable communicator relay device as claimed in claim 4, wherein said second relay unit further includes:

a synchronous receive section for obtaining a synchronous signal contained in the signal transmitted from said base station for synchronizing operation of said predetermined-size base station section with operation of said base station based on the synchronous signal.

7. A TDD portable communicator relay device as claimed in claim 1, wherein said second relay unit includes:

a detector for detecting a frequency channel used by said portable communicator terminal to detect that said portable telephone terminal is within said electrical wave insensitive region, and for producing a detection signal.

8. A TDD portable communicator relay device as claimed in claim 7, wherein, when said base station judges, based on the detection signal when the transmission/reception to said portable communicator terminal is conducted using said second relay unit, that said portable communicator terminal is not within said electrical wave insensitive region, the transmission/reception to said portable communicator terminal using said second relay unit is finished according to the control signal from said base station.

9. A relay device for a portable phone system, said relay device communicating with a base station positioned outside a structure and at least one portable radio telephone positioned within said structure, wherein radio signals cannot pass through said structure, said relay device comprising:

an external antenna positioned outside said structure for communicating with said base station;

an internal antenna positioned within said structure for communicating with said at least one portable radio telephone;

a circuit, connected to said external antenna and said internal antenna, for transmitting said radio signals between said base station and said at least one portable radio telephone; and a wired telephone connection between said circuit and said base station, wherein said circuit reserves frequencies within said base station and within said relay device for said at least one portable radio telephone, when said portable radio telephone is engaged in a telephone call, such that said portable radio telephone maintains said telephone call inside and outside said structure without interruption.

10. A relay device as in claim 9, wherein said circuit comprises:

a first relay unit coupled between said external antenna and said internal antenna; and a second relay unit, wired to said base station and coupled to said internal antenna, said second relay unit including an exclusive telephone line connecting unit wired to said base station, a position detecting unit coupled to said exclusive telephone line connecting unit, an internal base station section coupled to said exclusive telephone line connecting unit, and a synchronous receive section coupled to said internal base station section.

11. A relay device as in claim 9, wherein said circuit performs time division duplexing in coordination with said base station.

12. A relay device for a portable phone system, said relay device communicating with a base station positioned outside a structure and at least one portable radio telephone positioned within said structure, wherein radio signals cannot pass through said structure, said relay device comprising:

an external antenna positioned outside said structure for communicating with said base station;

an internal antenna positioned within said structure for communicating with said at least one portable radio telephone;

a circuit, connected to said external antenna and said internal antenna, for transmitting said radio signals between said base station and said at least one portable radio telephone; and a wired telephone connection between said circuit and said base station, wherein said circuit reserves frequencies within said base station and within said relay device for said at least one portable radio telephone, when said portable radio telephone is engaged in a telephone call, such that said portable radio telephone maintains said telephone call inside and outside said structure without interruption, and wherein a control signal for reserving frequencies is transmitted along said wired telephone connection.

13. A portable telephone relay device for relaying a radio telephone line between a radio base station and a portable telephone terminal which is within an electrical wave insensitive region, said device comprising:

- a first relay unit for relaying said radio telephone terminal within the electrical wave insensitive region using an available radio zone frequency channel of said radio base station; and
- a second relay unit, connected to said radio base station through a wired telephone line, for defining said available radio zone frequency based on a control signal transmitted from said radio base station.

14. A time division duplex (TDD) portable communicator relay device for relaying a communication line between a base station within one zone in a TDD system portable communicator service area including a plurality of zones and a portable communicator terminal which is within an electrical wave insensitive region in the zone, said device comprising:

- a first relay unit for relaying a communication line between said base station and the portable communicator terminal within the electrical wave insensitive region in the zone of said base station, using a zone frequency channel of said base station; and
- a second relay unit, connected to said base station through an exclusive wire communication line, for conducting transmission/reception with respect to said base station through said exclusive wire communication line, and for conducting transmission/reception with respect to said portable communicator terminal within said electrical wave insensitive region using a predetermined frequency channel of a plurality of predetermined frequency channels which is not assigned to said zone, wherein a relay between said base station and said portable communicator terminal is conducted based on a control signal from said base station using any of said first relay unit and said second relay unit, wherein said base station outputs a control signal instructing that the communication line is relayed by said second relay unit using said predetermined frequency channel of a plurality of predetermined frequency channels when an unused channel exists in said predetermined frequency channels used in said second relay unit.

15. A time division duplex (TDD) portable communicator relay device for relaying a communication line between a base station within one zone in a TDD system portable communicator service area including a plurality of zones and a portable communicator terminal which is within an electrical wave insensitive region in the zone, said device comprising:

- a first relay unit for relaying a communication line between said base station and the portable communicator terminal within the electrical wave insensitive region in the zone of said base station, using a zone frequency channel of said base station; and
- a second relay unit, connected to said base station through an exclusive wire communication line, for conducting transmission/reception with respect to said base station through said exclusive wire communication line, and for conducting transmission/reception with respect to said portable communicator terminal within said electrical wave insensitive region using a predetermined frequency channel of a plurality of predetermined frequency channels which is not assigned to said zone, wherein a relay between said base station and said portable communicator terminal is conducted based on a control signal from said base station using any of said first relay unit and said second relay unit, and wherein said base station outputs a control signal instructing that the communication line is relayed by said first relay unit using a zone frequency channel of said base station when said predetermined frequency channels include no unused channel.

16. A portable telephone relay device for relaying a radio telephone line between a radio base station and a portable telephone terminal which is within an electrical wave insensitive region, said device comprising:

- a first relay unit for relaying said radio telephone line between said radio base station and the portable telephone terminal within the electrical wave insensitive region using an available radio zone frequency channel of said radio base station; and
- a second relay unit, connected to said base station through a wired telephone line, for defining said available radio zone frequency based on a control signal transmitted from said radio base station, and wherein said base station outputs a control signal instructing that the communication line is relayed by said second relay unit using said predetermined frequency channel of a plurality of predetermined frequency channels when an unused channel exists in said predetermined frequency channels used in said second relay unit.

17. A portable telephone relay device for relaying a radio telephone line between a radio base station and a portable telephone terminal which is within an electrical wave insensitive region, said device comprising:

- a first relay unit for relaying said radio telephone line between said radio base station and the portable telephone terminal within the electrical wave insensitive region using an available radio zone frequency channel of said radio base station; and
- a second relay unit, connected to said base station through a wired telephone line, for defining said available radio zone frequency based on a control signal transmitted from said radio base station, and wherein said base station outputs a control signal instructing that the communication line is relayed by said first relay unit using a zone frequency channel of said base station when said predetermined frequency channels include no unused channel.

\* \* \* \* \*